US012012038B2

(12) United States Patent
 Ko

(10) Patent No.: US 12,012,038 B2
(45) Date of Patent: Jun. 18, 2024

(54) DRIVER ASSISTANCE SYSTEM, A CONTROL METHOD THEREOF, AND A VEHICLE

(71) Applicants: HYUNDAI MOTOR COMPANY, Seoul (KR); KIA CORPORATION, Seoul (KR)

(72) Inventor: Hyuk Ko, Incheon (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 51 days.

(21) Appl. No.: 18/075,103

(22) Filed: Dec. 5, 2022

(65) Prior Publication Data

US 2023/0226975 A1 Jul. 20, 2023

(30) Foreign Application Priority Data

Jan. 17, 2022 (KR) .......................... 10-2022-0006336

(51) Int. Cl.
 *B60Q 5/00* (2006.01)
 *B60G 5/00* (2006.01)
 *G06V 20/58* (2022.01)

(52) U.S. Cl.
 CPC ............... *B60G 5/00* (2013.01); *B60Q 5/006* (2013.01); *G06V 20/58* (2022.01)

(58) Field of Classification Search
 CPC . B60Q 5/00; B60Q 5/006; B60Q 1/00; B60Q 1/0023; B60Q 1/22; B60Q 1/2611; B60Q 1/50; B60Q 1/535; G06F 7/00; G01K 15/00; G01K 15/02; G08G 1/16; G08G 1/161; G01S 13/00; G06V 20/58; H04R 29/00

See application file for complete search history.

(56) References Cited

U.S. PATENT DOCUMENTS

| | | | |
|---|---|---|---|
| 11,458,891 B1* | 10/2022 | Kuehner | H04R 1/323 |
| 2013/0261887 A1* | 10/2013 | Raz | B60Q 5/00 381/77 |
| 2013/0311035 A1* | 11/2013 | Czyz | B60Q 1/2611 342/52 |
| 2018/0077492 A1* | 3/2018 | Yamada | H04R 3/12 |

OTHER PUBLICATIONS

NPL Search (Mar. 11, 2024).*

* cited by examiner

*Primary Examiner* — Van T Trieu
(74) *Attorney, Agent, or Firm* — Lempia Summerfield Katz LLC

(57) ABSTRACT

A driver assistance system includes: a first speaker disposed on a vehicle and configured to output an omnidirectional sound; a second speaker disposed on the vehicle and configured to output a directional sound; and a controller configured to be electrically connected to the first speaker and the second speaker. The controller is configured to control the first speaker to output the omnidirectional sound while the vehicle is reversing and control, based on an obstacle being identified at a rear of the vehicle while the vehicle is reversing, the second speaker to output the directional sound directed toward the obstacle.

20 Claims, 7 Drawing Sheets

DRIVER ASSISTANCE SYSTEM, A CONTROL METHOD THEREOF, AND A VEHICLE

CROSS-REFERENCE TO RELATED APPLICATION

This application is based on and claims priority under 35 U.S.C. § 119 to Korean Patent Application No. 10-2022-0006336, filed on Jan. 17, 2022 in the Korean Intellectual Property Office, the entire contents of which are incorporated herein by reference.

BACKGROUND

1. Technical Field

The disclosure relates to a driver assistance system, a control method thereof, and a vehicle, and more particularly, to a driver assistance system assisting a driver's vehicle control, a control method thereof, and a vehicle.

2. Background Art

As the most common means of transportation in modern society, the number of people using vehicles is increasing. Although the development of vehicle technology has the advantage of making long-distance travel easier and living more conveniently, traffic congestion often occurs in places with high population density such as South Korea.

A lot of research on a vehicle equipped with an advanced driver assistance system (ADAS) that actively provides information about a vehicle state, a driver state and traffic environment has been recently carried out to reduce drivers' burden and improve convenience.

For example, ADAS may provide functions such as a forward collision avoidance (FCA), an autonomous emergency braking (AEB), a driver attention warning (DAW), and the like.

Also, ADAS may provide a view of a rear of a vehicle when the vehicle is reversing and warn a driver of an obstacle located at the rear of the vehicle.

SUMMARY

An aspect of the disclosure provides a driver assistance system, a control method thereof, and a vehicle that may warn an outside of the vehicle that the vehicle is reversing via light and/or sound.

An aspect of the disclosure provides a driver assistance system, a control method thereof, and a vehicle that may warn that an obstacle is detected at a rear of the vehicle when in reverse.

Additional aspects of the disclosure are set forth in part in the description which follows and, in part, should be understood from the description, or may be learned by practice of the disclosure.

According to an aspect of the disclosure, there is provided a driver assistance system including: a first speaker disposed on a vehicle and configured to output an omnidirectional sound; a second speaker disposed on the vehicle and configured to output a directional sound; and a controller configured to be electrically connected to the first speaker and the second speaker. The controller is configured to control the first speaker to output the omnidirectional sound while the vehicle is reversing and, based on an obstacle being identified at a rear of the vehicle while the vehicle is reversing, control the second speaker to output the directional sound directed toward the obstacle.

The driver assistance system further includes a camera having a field of view facing the rear of the vehicle and configured to capture image data. The controller is configured to identify the obstacle located at the rear of the vehicle based on processing of the image data.

The controller is configured to identify a direction of the obstacle based on the processing of the image data and control the second speaker to output the directional sound toward the obstacle.

The controller is configured to classify the obstacle based on the processing of the image data and control the second speaker to output directional sounds with different frequencies based on a classification of the obstacle.

The controller is configured to control the second speaker to output a directional sound with a first frequency based on the obstacle being a person and control the second speaker to output a directional sound with a second frequency greater than the first frequency based on the obstacle being an animal.

The driver assistance system further includes an ultrasonic sensor configured to have a field of view facing the rear of the vehicle and acquire ultrasonic data. The controller is configured to identify the obstacle located at the rear of the vehicle based on processing of the ultrasonic data.

The controller is configured to identify a direction of the obstacle based on the processing of the ultrasonic data and control the second speaker to output the directional sound toward the obstacle.

The controller is configured to identify a distance to the obstacle based on the processing of the ultrasonic data and control the second speaker to output the directional sound based on the distance to the obstacle.

The controller is configured to control the second speaker to output the directional sound based on the distance to the obstacle being greater than a reference distance and brake the vehicle based on the distance to the obstacle being less than or equal to the reference distance.

The second speaker includes a plurality of ultrasonic speakers each of which outputs ultrasonic waves with different frequencies.

The driver assistance system further includes a motor configured to rotate or move the second speaker.

The controller is configured to control the first speaker and the second speaker to output a sound of a first volume during daytime and control the first speaker and the second speaker to output a sound of a second volume lower than the first volume at night.

The controller is configured to control the second speaker to output the directional sound directed toward the obstacle based on a distance to the obstacle being less than or equal to a first reference distance.

The driver assistance system further includes a light source configured to emit light. The controller is configured to control the light source to emit the light toward the obstacle based on the distance to the obstacle being less than or equal to a second reference distance less than the first reference distance.

The controller is configured to brake the vehicle based on the distance to the obstacle being less than or equal to a third reference distance less than the second reference distance.

According to an aspect of the disclosure, there is provided a control method of a driver assistance system, the control method including: outputting an omnidirectional sound while a vehicle is reversing; identifying an obstacle located at a rear of the vehicle while the vehicle is reversing; and outputting a directional sound directed toward the obstacle based on the obstacle being identified at the rear of the vehicle.

According to an aspect of the disclosure, there is provided a vehicle including: a first speaker configured to output an omnidirectional sound; a second speaker configured to output a directional sound; and a controller configured to be electrically connected to the first speaker and the second speaker. The controller is configured to control the first speaker to output the omnidirectional sound while the vehicle is reversing and, based on an obstacle being identified at a rear of the vehicle while the vehicle is reversing, control the second speaker to output the directional sound directed toward the obstacle.

BRIEF DESCRIPTION OF THE DRAWINGS

These and/or other aspects of the disclosure should become apparent and more readily appreciated from the following description of the embodiments, taken in conjunction with the accompanying drawings of which.

DETAILED DESCRIPTION

Figure 1:
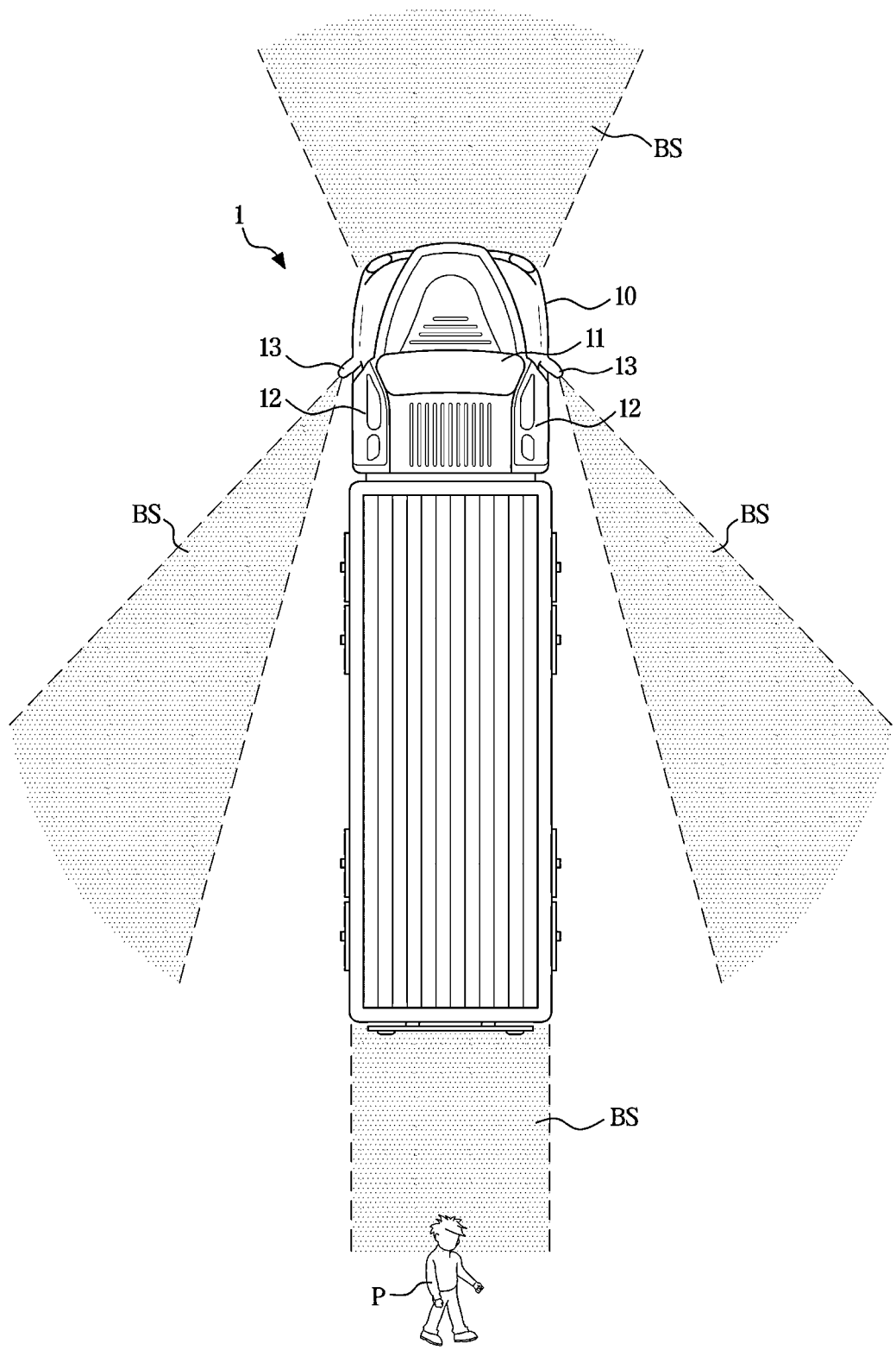
FIG. 1 illustrates a driver's blind spots of a vehicle according to an embodiment.

Like reference numerals throughout the specification denote like elements. Also, this specification does not describe all the elements according to embodiments of the disclosure, and descriptions well-known in the art to which the disclosure pertains or overlapped portions are omitted. The terms such as "~part", "~member", "~module", "~block", and the like may refer to at least one process processed by at least one hardware or software. According to embodiments, a plurality of "~parts", "~members", "~modules", or "~blocks" may be embodied as a single element, or a single "~part", "~member", "~module", or "~block" may include a plurality of elements.

It should be understood that when an element is referred to as being "connected" to another element, it can be directly or indirectly connected to the other element, wherein an indirect connection includes connection via a wireless communication network.

It should be understood that the term "include" when used in this specification, specifies the presence of stated features, integers, steps, operations, elements, and/or components, but does not preclude the presence or addition of one or more other features, integers, steps, operations, elements, components, and/or groups thereof.

It should be understood that when it is stated in this specification that a member is located "on" another member, not only a member may be in contact with another member, but also still another member may be present between the two members.

It should be understood that, although the terms first, second, and the like may be used herein to describe various elements, these elements should not be limited by these terms.

It is to be understood that the singular forms are intended to include the plural forms as well, unless the context clearly dictates otherwise.

Reference numerals used for method steps are just used for convenience of explanation, but not to limit an order of the steps. Thus, unless the context clearly dictates otherwise, the written order may be practiced otherwise.

Hereinafter, an operation principle and embodiments are described in detail with reference to the accompanying drawings.

FIG. 1 illustrates a driver's blind spots of a vehicle according to an embodiment.

A vehicle 1 may include a body 10 that defines an exterior of the vehicle 1 and accommodates a driver and/or cargo, a chassis including constituent components of the vehicle 1 except for the body 10, and electronic components for protecting the driver or providing the driver with convenience. The body 10 may form an interior space for the driver to stay, an engine room for accommodating an engine, and a trunk room for accommodating cargo. The chassis may include devices capable of generating power to drive the vehicle 1 according to the driver's control and driving/braking/steering the vehicle 1 using the power.

The driver may see an outside of the vehicle 1 from an inside of the vehicle 1, and accelerate, decelerate, steer or brake the vehicle 1 depending on an external environment of the vehicle 1.

The vehicle 1 may be provided with a variety of devices and/or apparatuses enabling the driver to acquire information (e.g., visual information and/or auditory information, and the like) about the external environment of the vehicle 1. For example, the vehicle 1 may be provided with a front window 11 for providing the driver with a front view and side windows 12 for providing the driver with side views. Also, the body 10 may be provided with side mirrors 13 for providing the driver with rear views.

Despite the front window 11, the side windows 12 and the side mirrors 13, one or more blind spots BS that cannot be seen by the driver may exist.

For example, the driver's rear field of view is extremely restricted. In particular, as shown in FIG. 1, when the vehicle 1 is a large commercial vehicle such as a truck, a bus, and the like, the driver is unable to see a rear of the vehicle 1.

In other words, as shown in FIG. 1, the driver may not see a pedestrian P located at the rear of the vehicle 1 (large commercial vehicle). In particular, when in reverse, because the driver of the vehicle 1 may not see the pedestrian P, the vehicle 1 controlled by the driver may collide with the pedestrian P.

In order to prevent the vehicle 1 in reverse from colliding with the pedestrian P, the vehicle 1, particularly, the large commercial vehicle, may output a reverse warning sound toward an outside when reversing.

However, outputting a warning sound of the vehicle 1 at night may be a noise problem to people around the vehicle 1. Accordingly, regulations limiting vehicle warning sound emissions are in effect.

Thus, the vehicle 1 according to an embodiment provides a warning method that may minimize peoples' inconvenience around the vehicle 1.

Figure 2:
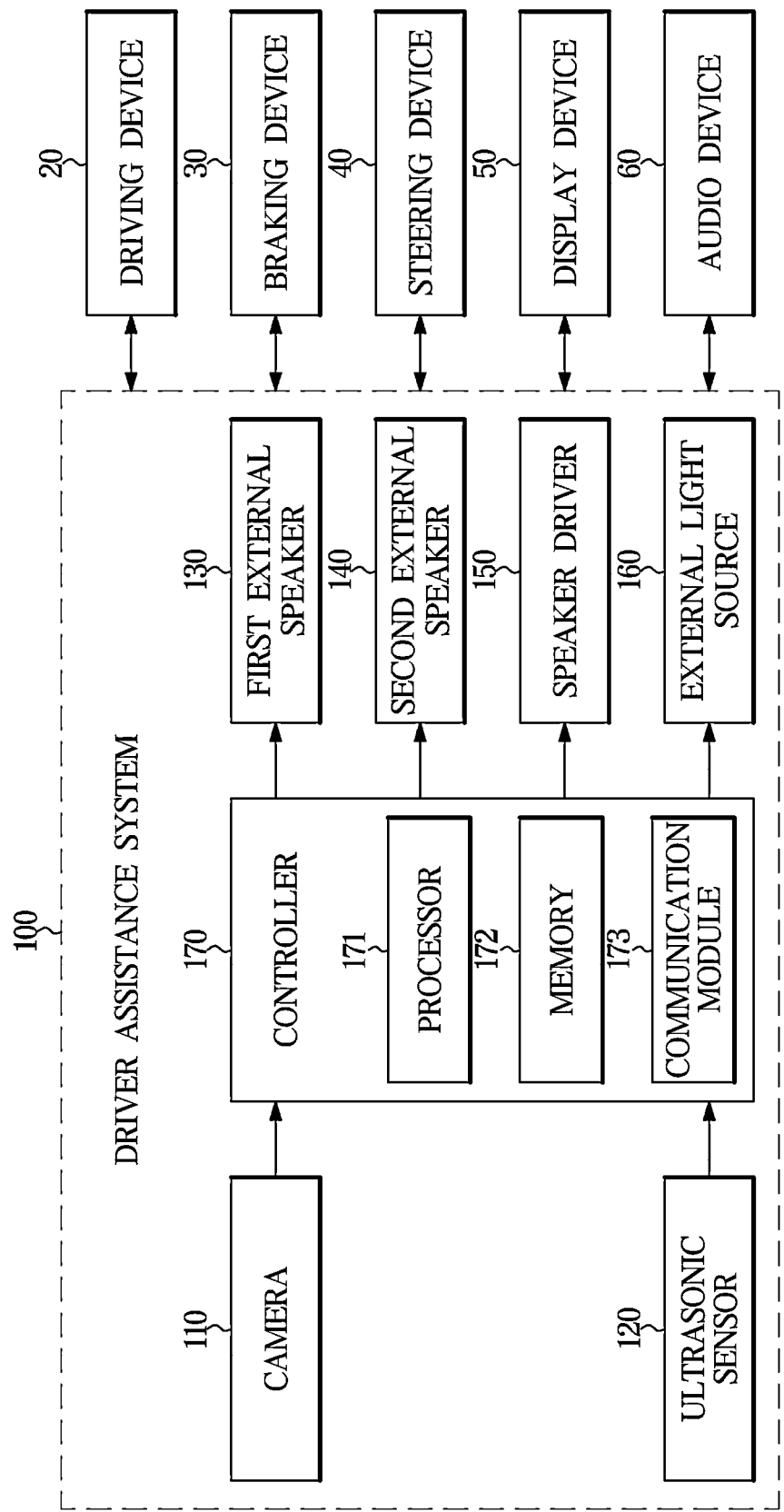
FIG. 2 illustrates a configuration of a vehicle and a driver assistance system according to an embodiment.
Figure 3:
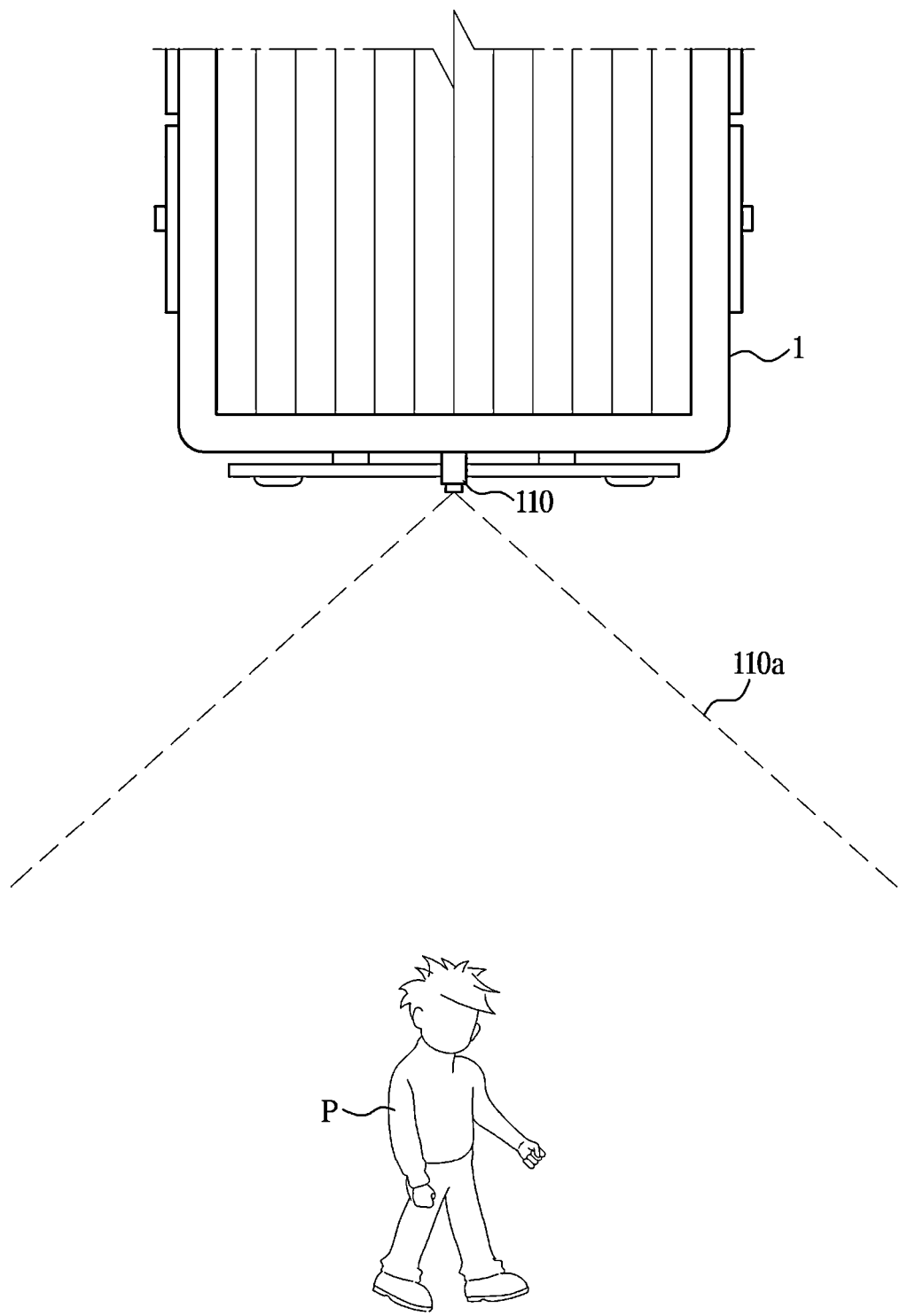
FIG. 3 illustrates a field of view of a camera included in a driver assistance system according to an embodiment.
Figure 4:
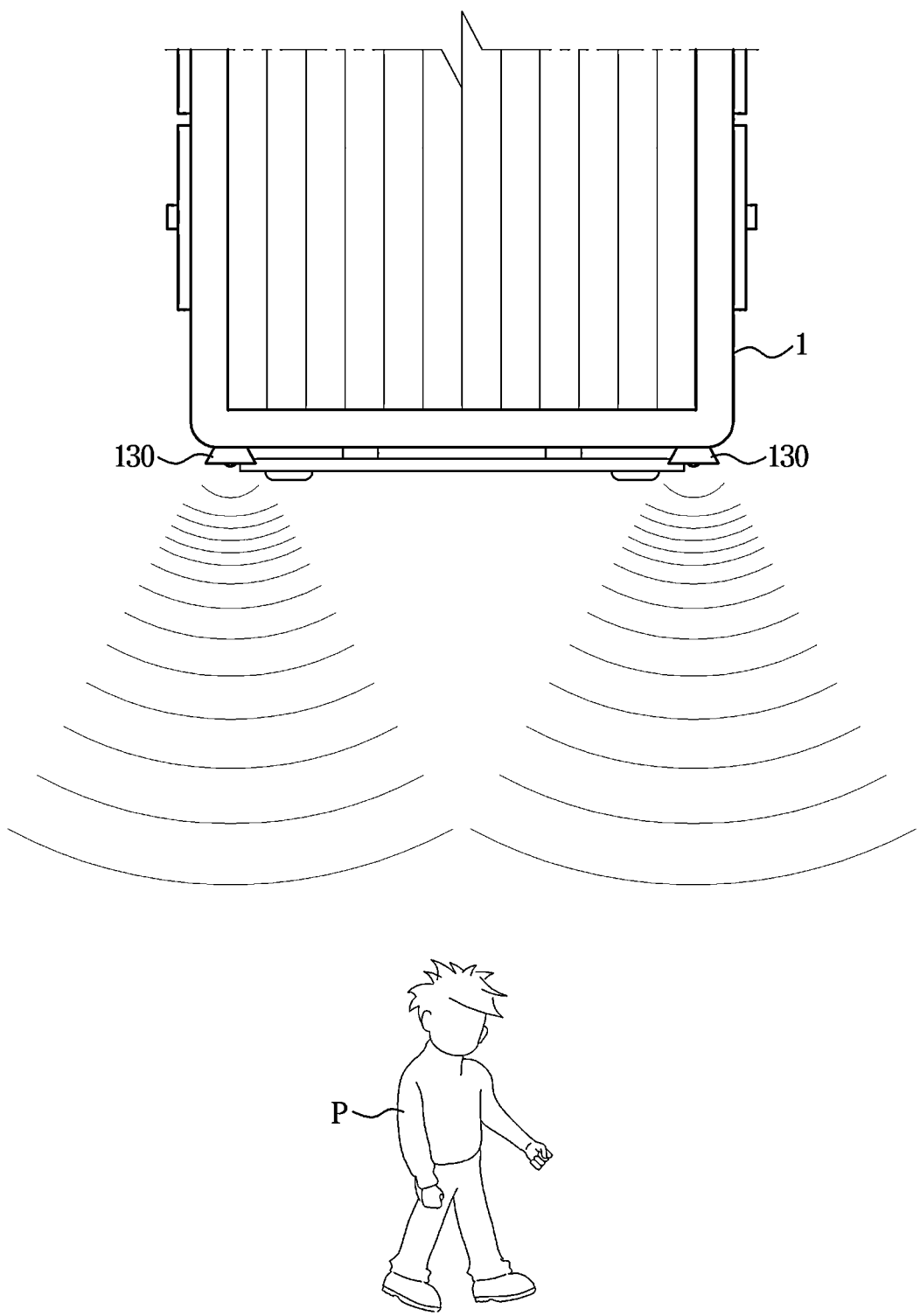
FIG. 4 illustrates an operation of a first external speaker included in a driver assistance system according to an embodiment.
Figure 5:
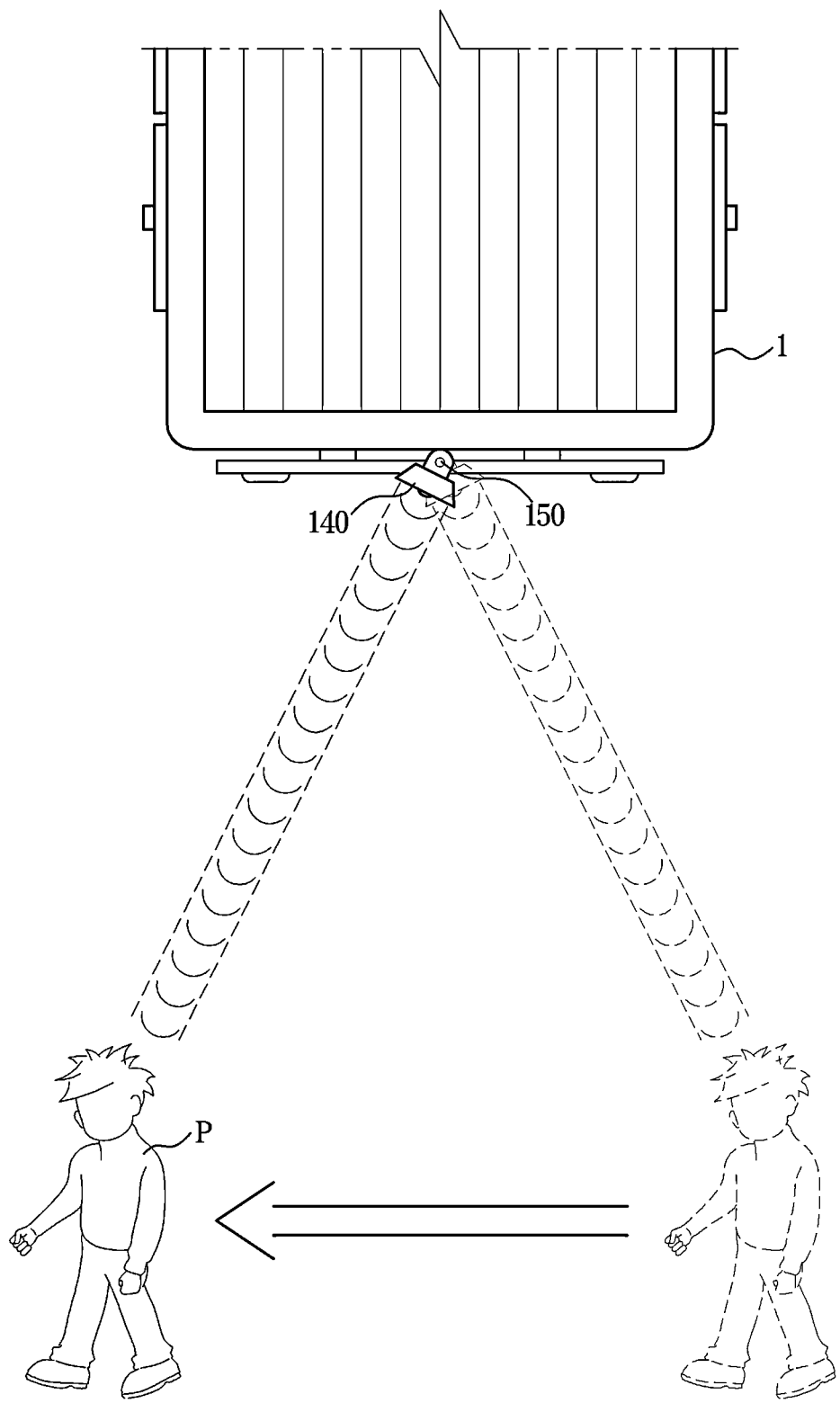
FIG. 5 illustrates an operation of a second external speaker included in a driver assistance system according to an embodiment.

FIG. 2 illustrates a configuration of a vehicle and a driver assistance system according to an embodiment. FIG. 3 illustrates a field of view of a camera included in a driver assistance system according to an embodiment. FIG. 4 illustrates an operation of a first external speaker included in a driver assistance system according to an embodiment. FIG. 5 illustrates an operation of a second external speaker included in a driver assistance system according to an embodiment.

Referring to FIGS. 2-5, the vehicle 1 may include a driving device 20, a braking device 30, a steering device 40, a display device 50, an audio device 60 and a driver assistance system (DAS) 100.

The driving device 20 may drive the vehicle 1 to move the vehicle 1 and, for example, include an engine, an engine management system (EMS), a transmission, and a transmission control unit (TCU). The engine may generate power for driving the vehicle 1. The EMS may control the engine in response to a driver's acceleration intention through an accelerator pedal or a request from the DAS 100. The transmission may decelerate and transmit the power generated by the engine to vehicle wheels. The TCU may control the transmission in response to a driver's shift command through a shift lever and/or a request from the DAS 100.

The braking device 30 may stop the vehicle 1 and, for example, include a brake caliper and an electronic brake control module (EBCM). The brake caliper may decelerate or stop the vehicle 1 using friction with a brake disc. The EBCM may control the brake caliper in response to a driver's braking intention through a brake pedal and/or a request from the DAS 100. For example, the EBCM may receive a deceleration request including a deceleration from the DAS 100 and control the brake caliper electrically or hydraulically to decelerate the vehicle 1 based on the requested deceleration.

The steering device 40 may include an electronic power steering control module (EPS). The steering device 40 may change a driving direction of the vehicle 1. The EPS may assist operations of the steering device 40 so that a driver may easily manipulate a steering wheel according to a driver's steering intention. The EPS may also control the steering device in response to a request from the DAS 100. For example, the EPS may receive a steering request including a steering torque from the DAS 100 and control the steering device to steer the vehicle 1 based on the requested steering torque.

The display device 50 may include a cluster, a head-up display, a center fascia monitor, and the like, and provide a driver with various information and entertainment through images and sounds. For example, the display device 50 may provide the driver with travel information of the vehicle 1, a warning message, and the like.

The audio device 60 may include a plurality of speakers and provide the driver with various information and entertainment through sounds. For example, the audio device 60 may provide the driver with travel information of the vehicle 1, a warning message, and the like.

The DAS 100 may communicate with the driving device 20, the braking device 30, the steering device 40, the display device 50, and the audio device 60 via a vehicle communication network.

For example, the DAS 100 may receive a signal related to reversing of the vehicle 1 from the driving device 20 and identify whether the vehicle 1 is reversing based on the received signal. For instance, when an obstacle such as a pedestrian P, and the like, is detected when the vehicle 1 is reversing, the DAS 100 may control the display device 50 and/or the audio device 60 to provide the driver with a visual warning and/or an audible warning. Also, for example, when a collision between the vehicle 1 and the obstacle such as the pedestrian P is predicted when in reverse, the DAS 100 may control the braking device 30 to stop reversing of the vehicle 1.

The DAS 100 may include a camera 110, an ultrasonic sensor 120, a first external speaker 130, a second external sensor 140, a speaker driver 150, an external light source 160 and/or a controller 170. However, the DAS 100 is not limited to that shown in FIG. 2. For example, one of the camera 110 or the ultrasonic sensor 120 may be omitted, or the first external speaker 130, the speaker driver 150, or the external light source 160 may be omitted from the DAS 100 shown in FIG. 2.

The camera 110 may photograph the rear of the vehicle 1 and acquire image data on the rear of the vehicle 1. For example, as shown in FIG. 3, the camera 110 may have a field of view 110a facing the rear of the vehicle 1.

The camera 110 may include a plurality of lens and image sensors. The image sensor may include a plurality of photodiodes converting light into an electrical signal, and the plurality of photodiodes may be arranged in a two-dimensional (2D) matrix.

The image data may include information about another vehicle, a pedestrian, an animal, or an unidentifiable object located at the rear of the vehicle 1.

The camera 110 may include an image processor that processes the image data and detects a rear object of the vehicle 1 based on the processing of the image data. For example, the camera 110 may generate a track that represents an object using image processing and classify the track. For example, the camera 110 may identify whether the track is another vehicle, a pedestrian, an animal, or an unidentifiable object.

The camera 110 may be electrically connected to the controller 170. For example, the camera 110 may be connected to the controller 170 via a vehicle communication network (NT), a hard wire, or a printed circuit board (PCB). The camera 110 may transmit the image data on the rear of the vehicle 1 (or a position and classification of the track) to the controller 170.

The ultrasonic sensor 120 may transmit an ultrasonic wave toward the rear of the vehicle 1 and detect a rear object of the vehicle 1 based on the ultrasonic wave reflected from the rear object. For example, the ultrasonic sensor 120 may have a field of sensing facing the rear of the vehicle 1.

For example, the ultrasonic sensor 120 may include an ultrasonic speaker transmitting an ultrasonic wave toward the rear of the vehicle 1, and an ultrasonic microphone that receives the ultrasonic wave reflected from an object. The ultrasonic sensor 120 may acquire ultrasonic data from the ultrasonic wave transmitted by the ultrasonic speaker and the ultrasonic wave received by the ultrasonic microphone. The ultrasonic data may include location information (e.g., distance information) of objects located at the rear of the vehicle 1.

The ultrasonic sensor 120 may include a signal processor that processes the ultrasonic data. The signal processor may generate a track that represents an object by clustering reflection points of the received ultrasonic wave. The ultrasonic sensor 120 may acquire a distance of the track based on a time difference between a transmission time of the transmitted ultrasonic wave and a reception time of the received ultrasonic wave (i.e., a time for which the ultrasonic wave travels from transmission to reception).

For example, the ultrasonic sensor 120 may be connected to the controller 170 via a vehicle communication network (NT), a hard wire, or a PCB, and transmit the ultrasonic data (or a distance of the track) to the controller 170.

As shown in FIG. 4, the first external speaker 130 may be provided at the rear of the vehicle 1 and output a sound.

The first external speaker 130 may output a sound over a wide angular range. The sound output by the first external speaker 130 may propagate to sides and/or a front of the vehicle 1 as well as the rear of the vehicle 1. Accordingly, not only people and/or animals located at the rear of the vehicle 1, but also people and/or animals located at the sides and/or front of the vehicle 1 may hear the sound output by the first external speaker 130.

The first external speaker 130 may receive an electrical signal for outputting a sound from the controller 170 when the vehicle 1 is reversing. For example, the first external speaker 130 may be connected to the controller 170 via a vehicle communication network (NT), a hard wire, or a PCB, and receive the electrical signal from the controller 170.

When the vehicle 1 is reversing, the first external speaker 130 may output a sound notifying that the vehicle 1 is reversing or a sound for warning that the vehicle 1 is reversing, according to the electrical signal of the controller 170. For example, the first external speaker 130 may output sounds with various frequencies that may draw attention of people and/or animals. However, a level (or volume) of the sound output by the first external speaker 130 may be limited by regulations.

The second external speaker 140 may be provided at the rear of the vehicle 1 as shown in FIG. 5, and output a sound directed toward the rear of the vehicle 1.

The second external speaker 140 may output a sound having directivity in a specific direction.

For example, the second external speaker 140 may include a plurality of ultrasonic speakers. Ultrasonic waves are known to have straightness unlike sound waves of audible frequencies. In other words, ultrasonic waves transmitted in a specific direction may be propagated within a narrow angular range.

In this instance, the plurality of ultrasonic speakers may transmit ultrasonic waves of different peak frequencies. For example, a first ultrasonic speaker may output an ultrasonic wave with a first frequency, and a second ultrasonic speaker may output an ultrasonic wave with a second frequency. The sound wave in which the ultrasonic wave with the first frequency and the ultrasonic wave with the second frequency are mixed may include a sound wave with a frequency corresponding to a difference between the first and second frequencies due to a beating phenomenon.

When the difference between the first and second frequencies is within human and/or animal audible frequency range, people and/or animals may hear the sound waves transmitted by the second external speaker 140 including the plurality of ultrasonic speakers. In this instance, because ultrasonic waves serving as a carrier of sound waves have straightness, the sound transmitted by the second external speaker 140 may have directivity.

As described above, the second external speaker 140 may output the sound having directivity in a specific direction. People and/or animals located within the direction (or angular range) to which the second external speaker 140 is directed are capable of hearing the sound output from the second external speaker 140, but people and/or animals located out of the direction (or angular range) to which the second external speaker 140 is directed may not hear the sound output from the second external speaker 140.

The speaker driver 150 may move or rotate the second external speaker 140 to change a direction to which the second external speaker 140 is directed.

For example, the speaker driver 150 may include a motor generating a torque, a belt and/or a gear (hereinafter, "gear, and the like") transmitting the generated torque to the second external speaker 140. The motor may generate the torque in response to a control signal of the controller 170, and the gear, and the like, may transmit the torque of the motor to the second external speaker 140.

As shown in FIG. 5, by moving or rotating the second external speaker 140 by the speaker driver 150, the direction to which the second external speaker 140 is directed may be changed. For instance, the speaker driver 150 may move or rotate the second external speaker 140 so that the second external speaker 140 is directed to a moving pedestrian.

The external light source 160 may emit light in a direction to which the second external speaker 140 is directed.

For example, the external light source 160 may include a plurality of light emitting diodes (LED), and the plurality of LEDs may be arranged along a circumference of an imaginary circle surrounding the second external speaker 140.

When the direction to which the second external speaker 140 is directed is changed by the speaker driver 150, a direction to which the external light source 160 emits light may also be changed. The direction to which the external light source 160 emits light may be the same as or parallel to the direction to which the second external speaker 140 is directed.

People and/or animals located within the direction (or angular range) to which the second external speaker 140 is directed may hear the sound output from the second external speaker 140, and recognize the light emitted by the external light source 160.

The controller 170 may be electrically connected to the camera 110, the ultrasonic sensor 120, the first external speaker 130, the second external speaker 140, the speaker driver 150, and/or the external light source 160. Also, the controller 170 may be connected to the driving device 20, the braking device 30, the steering device 40, the display device 50 and/or the audio device 60 via a vehicle communication network, and the like.

The controller 170 may be variously referred to as an electronic control unit (ECU), and the like. The controller 170 may include a processor 171, a memory 172 and a communication module 173. For example, the controller 170 may include one or more processors or one or more memories. The processor 171, the memory 172 and the communication module 173 may be implemented as separate semiconductor devices or as a single semiconductor device.

The processor 171 may process image data and/or ultrasonic data and output a control signal for controlling the first external speaker 130, the second external speaker 140, the speaker driver 150, and/or the external light source 160, based on the processing of the data.

The processor 171 may include a single chip (or a core) or a plurality of chips (or cores). For example, the processor 171 may include an image processor for processing the image data of the camera 110, a digital signal processor for processing the ultrasonic data of the ultrasonic sensor 120, and/or a micro control unit (MCU) for generating a driving signal/braking signal/steering signal.

The memory 172 may store a program and/or data for processing the image data and/or the ultrasonic data and outputting a control signal.

The memory 172 may include a volatile memory such as a static random-access memory (S-RAM) and dynamic random-access memory (D-RAM), and a non-volatile memory such as a read only memory (ROM), an erasable programmable read only memory (EPROM), and the like. The memory 172 may include a single memory device or a plurality of memory devices.

The communication module 173 may communicate with other electronic components of the vehicle 1 via a vehicle communication network. The communication module 173 may transmit and receive a communication signal with the driving device 20, the braking device 30, the steering device 40, the display device 50 and/or the audio device 60.

The communication module 173 may communicate with other electronic components of the vehicle 1 using various communication protocols. For example, the communication module 173 may transmit and receive a communication signal with other electronic components of the vehicle 1 using a controller area network (CAN).

For example, the communication module 173 may include a transmission circuit for transmitting a communication signal and a reception circuit for receiving the communication signal.

The controller 170 may receive a communication signal indicating a gear position of a transmission (hereinafter, "gear position signal") via a vehicle communication network. The controller 170 may identify whether the vehicle 1 is reversing based on the gear position signal.

When it is identified that the vehicle 1 is reversing, the controller 170 may activate the camera 110 and acquire image data from the camera 110. The controller 170 may identify an obstacle (object) located at the rear of the vehicle 1 based on the image data. The controller 170 may identify whether the obstacle is another vehicle, a pedestrian, an animal, or an unidentifiable object, based on the image data.

When it is identified that the vehicle 1 is reversing, the controller 170 may identify whether it is day or night, using an internal timer, an illuminance sensor, and the like.

When it is identified that the vehicle 1 is reversing, the controller 170 may activate the ultrasonic sensor 120 and acquire ultrasonic data from the ultrasonic sensor 120. The controller 170 may identify a distance to the obstacle located at the rear of the vehicle 1 based on the ultrasonic data. Also, the controller 170 may identify a time to collision with the obstacle, based on the distance to the obstacle and a reverse speed of the vehicle 1.

The controller 170 may control the first external speaker 130 and/or the second external speaker 140 to output a sound warning that the vehicle 1 is reversing.

The controller 170 may control the first external speaker 130 and/or the second external speaker 140 to output sounds with different frequencies based on classification of the obstacle.

For instance, when a pedestrian or another vehicle is identified, the controller 170 may control the first external speaker 130 and/or the second external speaker 140 to output a sound with a frequency difference of 1 kHz. In particular, the controller 170 may control the second external speaker 140 so that a first ultrasonic speaker outputs an ultrasonic wave with a frequency of 40 kHz and a second ultrasonic speaker outputs an ultrasonic wave with a frequency of 41 kHz.

When an animal is identified, the controller 170 may control the first external speaker 130 and/or the second external speaker 140 to output a sound with a frequency difference of 30 kHz. Humans are incapable of hearing sound with a frequency of 30 kHz, whereas animals are capable of hearing the sound with the frequency of 30 kHz. In particular, the controller 170 may control the second external speaker 140 so that the first ultrasonic speaker outputs the ultrasonic wave with the frequency of 40 kHz and the second ultrasonic speaker outputs an ultrasonic wave with a frequency of 70 kHz.

When both pedestrian and animal are identified, the controller 170 may control the first external speaker 130 and/or the second external speaker 140 to alternately output a sound with a frequency of 1 kHz and a sound with a frequency of 30 kHz.

When an unidentifiable object is identified, the controller 170 may control the first external speaker 130 and/or the second external speaker 140 to alternately output a sound with a frequency of 1 kHz and a sound with a frequency of 30 kHz.

The controller 170 may control the first external speaker 130 and/or the second external speaker 140 to output sounds with different volumes, based on whether it is currently day or night.

For example, when it is currently day, the controller 170 may control the first external speaker 130 and/or the second external speaker 140 to output a sound with a volume of 85 dB. Also, when it is currently night, the controller 170 may control the first external speaker 130 and/or the second external speaker 140 to output a sound with a volume of 80 dB.

The controller 170 may control the first external speaker 130 and/or the second external speaker 140 to output sounds with different volumes based on weather.

For example, when it is clear at night, the controller 170 may control the first external speaker 130 and/or the second external speaker 140 to output a sound with a volume of 80 dB, and when it is rainy at night, control the first external speaker 130 and/or the second external speaker 140 to output a sound with a volume of 85 dB.

The controller 170 may control the first external speaker 130 and/or the second external speaker 140 so that at least one of the first external speaker 130 or the second external speaker 140 outputs a sound based on a distance between the vehicle 1 and an obstacle.

For example, when the distance to the obstacle is greater than or equal to a reference distance, the controller 170 may control the first external speaker 130 to output a sound. Also, when the distance to the obstacle is less than the reference distance, the controller 170 may control the second external speaker 140 to output a sound.

In particular, when the distance to the obstacle is less than the reference distance, the controller 170 may identify a direction (or a position) of the obstacle using image data and/or ultrasonic data and control the speaker driver 150 so that the second external speaker 140 is directed to the obstacle. Also, when the distance to the obstacle is less than the reference distance, the controller 170 may control the external light source 160 to emit light.

The controller 170 may control the driving device 20 and/or the braking device 30 of the vehicle 1 to brake the vehicle 1, based on the distance between the vehicle 1 and the obstacle. When the distance to the obstacle is less than a critical distance, the controller 170 may control the driving device 20 and/or the braking device 30 of the vehicle 1 to brake the vehicle 1.

As described above, when in reverse, the DAS 100 may identify an obstacle located at the rear of the vehicle 1 and control the first external speaker 130 and/or the second external speaker 140 to output various sounds based on the identified obstacle.

In particular, the DAS 100 may control the first external speaker 130 to output a sound with a limited volume in order to minimize inconvenience of nearby people at night. Also, the DAS 100 may include the second external speaker 140 that may output a sound having directivity to minimize inconvenience of nearby people.

Figure 6:
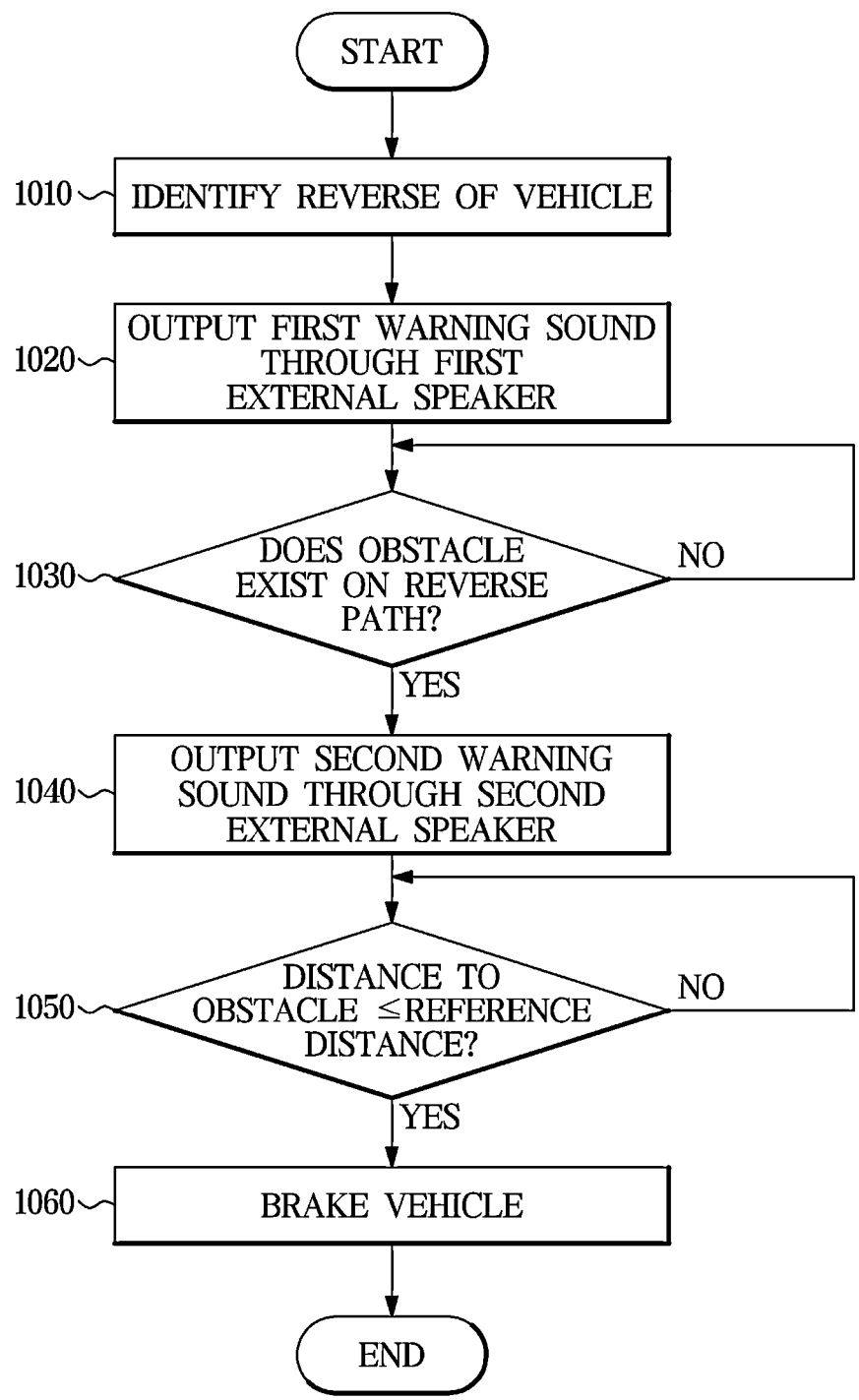
FIG. 6 illustrates an example of operations of a driver assistance system according to an embodiment.

FIG. 6 illustrates an example of operations of a driver assistance system according to an embodiment.

Referring to FIG. 6, the DAS 100 may identify reverse of the vehicle 1 (1010). In other words, the DAS 100 may identify whether the vehicle 1 is in reverse.

For example, the DAS 100 may receive a communication signal indicating a gear position of a transmission (hereinafter, "gear position signal") via a vehicle communication network. The DAS 100 may identify whether the vehicle 1 is reversing based on the gear position signal.

The DAS 100 may output a first warning sound through the first external speaker 130 (1020).

The first external speaker 130 may be an omnidirectional speaker, and the first warning sound may be an omnidirectional sound.

Based on whether it is currently day or night, the DAS 100 may control the first external speaker 130 to adjust a volume of the first warning sound. For example, the DAS 100 may control the first external speaker 130 to output the first warning sound with a volume of 85 dB during daytime and control the first external speaker 130 to output the first warning sound with a volume of 80 dB at night.

The DAS 100 may identify whether an obstacle exists on a reverse path of the vehicle 1 (1030).

For example, the DAS 100 may activate the camera 110 provided at the rear of the vehicle 1 and acquire image data from the camera 110. The DAS 100 may identify whether the obstacle is located on the reverse path of the vehicle 1 based on the image data.

When the obstacle does not exist on the reverse path of the vehicle 1 (No in operation 1030), the DAS 100 may continue to output the first warning sound through the first external speaker 130.

When the obstacle exists on the reverse path of the vehicle 1 (Yes in operation 1030), the DAS 100 may output a second warning sound through the second external speaker 140 (1040).

The second external speaker 140 may be a directional speaker and the second warning sound may be a directional sound.

For example, the DAS 100 may identify a direction (or a position) of the obstacle based on the image data and control the second external speaker 140 and the speaker driver 150 to output the second warning sound toward the obstacle.

The DAS 100 may control the speaker driver 150 so that the second external speaker 140 is directed to the obstacle and control the second external speaker 140 to output a directional warning sound.

Also, the DAS 100 may classify the obstacle (e.g., another vehicle, a pedestrian, an animal, an unidentifiable object) based on the image data. The DAS 100 may control the second external speaker 140 to adjust a frequency of the second warning sound based on classification of the obstacle. For instance, when a person is identified, the DAS 100 may control the second external speaker 140 to output the second warning sound with a frequency of 1 kHz. Also, when an animal is identified, the DAS 100 may control the second external speaker 140 to output the second warning sound with a frequency of 30 kHz.

The DAS 100 may identify whether a distance between the vehicle 1 and the obstacle is less than or equal to a reference distance (1050).

For example, the DAS 100 may activate the ultrasonic sensor 120 provided at the rear of the vehicle 1 and acquire ultrasonic data from the ultrasonic sensor 120. The DAS 100 may identify a distance to the obstacle located on the reverse path of the vehicle 1 based on the ultrasonic data.

When the distance to the obstacle is greater than a reference distance (No in operation 1050), the DAS 100 may continue to output the second warning sound through the second external speaker 140.

When the distance to the obstacle is less than or equal to the reference distance (Yes in operation 1050), the DAS 100 may brake the vehicle 1 (i.e., cause the vehicle 1 to brake) (1060).

For example, the DAS 100 may transmit a communication signal for braking the vehicle 1 to the braking device 30 via a vehicle communication network. The braking device 30 may brake the vehicle 1 in response to the communication signal of the DAS 100.

As described above, the DAS 100 may include a directional speaker, and warn people or animals located at the rear of the vehicle 1 of the reverse of the vehicle 1 without causing inconvenience.

Accordingly, the DAS 100 may inhibit or prevent a collision between the vehicle 1 and people (or animals) caused by the reverse of the vehicle 1 without causing inconvenience.

Figure 7:
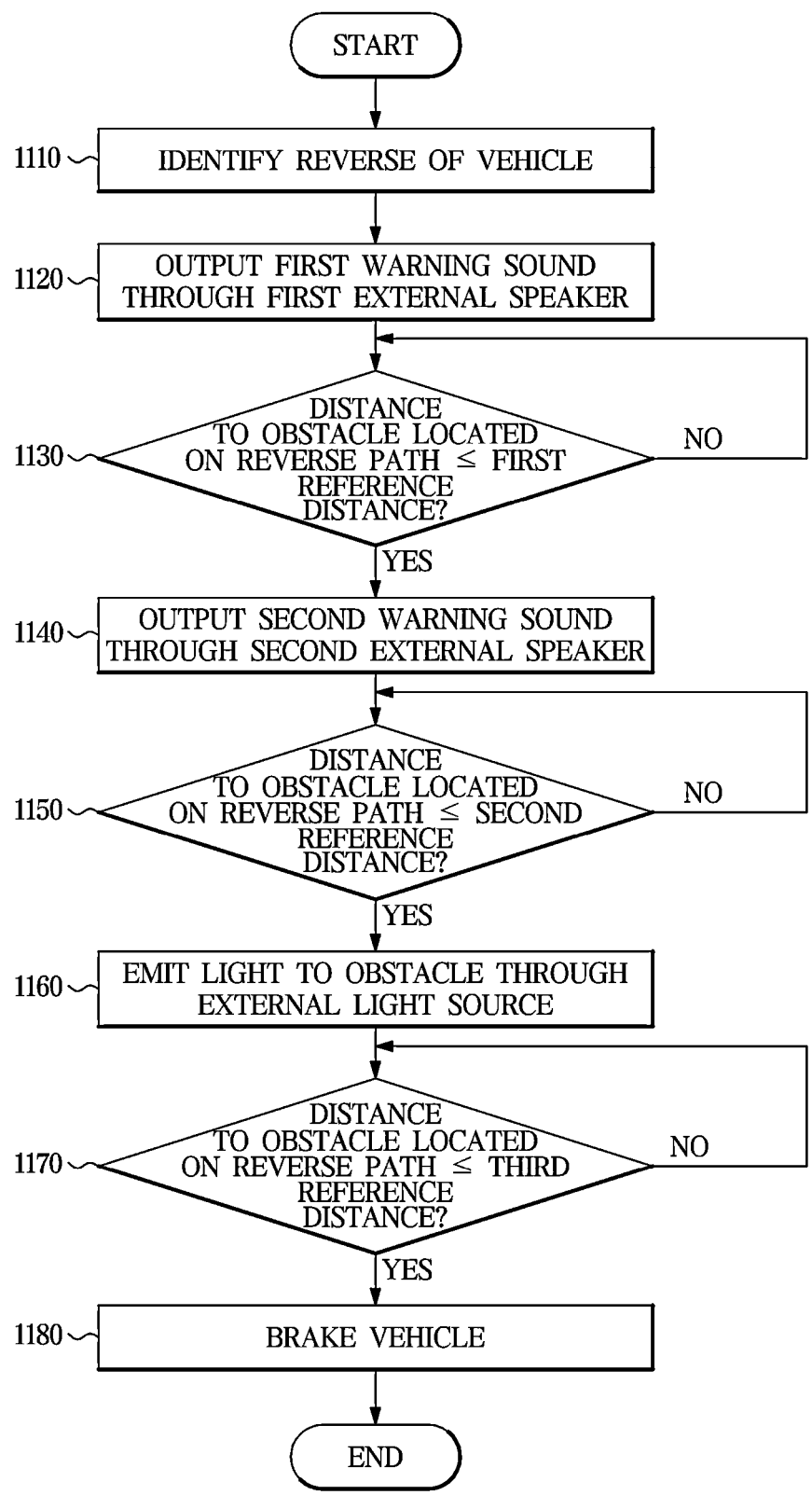
FIG. 7 illustrates another example of operations of a driver assistance system according to an embodiment.

FIG. 7 illustrates another example of operations of a driver assistance system according to an embodiment.

Referring to FIG. 7, the DAS 100 may identify whether the vehicle 1 is in reverse (1110). The DAS 100 may output a first warning sound through the first external speaker 130 (1120).

The operation 1110 and operation 1120 may be the same as the operation 1010 and operation 1020 of FIG. 6, respectively.

The DAS 100 may identify whether a distance to an obstacle located on a reverse path of the vehicle 1 is less than or equal to a first reference distance (1130).

For example, the DAS 100 may acquire image data from the camera 110 and identify whether the obstacle exists on the reverse path of the vehicle 1 based on the image data.

Also, the DAS 100 may acquire ultrasonic data from the ultrasonic sensor 120 and identify the distance to the obstacle located on the reverse path of the vehicle 1 based on the ultrasonic data.

When the distance to the obstacle is greater than the first reference distance (No in operation 1130), the DAS 100 may continue to output the first warning sound through the first external speaker 130.

When the distance to the obstacle is less than or equal to the first reference distance (Yes in operation 1130), the DAS 100 may output a second warning sound through the second external speaker 140 (1140).

The operation 1140 may be the same as the operation 1040 of FIG. 6.

The DAS 100 may identify whether the distance to the obstacle located on the reverse path of the vehicle 1 is less than or equal to a second reference distance (1150).

The second reference distance may be shorter than the first reference distance.

When the distance to the obstacle is greater than the second reference distance (No in operation 1150), the DAS 100 may continue to output the second warning sound through the second external speaker 140.

When the distance to the obstacle is less than or equal to the second reference distance (Yes in operation 1150), the DAS 100 may emit light toward the obstacle through the external light source 160 (1160).

For example, the external light source 160 may move or rotate together with the second external speaker 140 by the speaker driver 150 and emit light in the same or parallel direction to the second external speaker 140.

The DAS 100 may control the external light source 160 to emit warning light to the obstacle together with the second warning sound of the second external speaker 140.

The DAS 100 may identify whether the distance to the obstacle located on the reverse path of the vehicle 1 is less than or equal to a third reference distance (1170).

The third reference distance may be shorter than the first reference distance and the second reference distance.

When the distance to the obstacle is greater than the third reference distance (No in operation 1170), the DAS 100 may continue to emit light through the external light source 160.

When the distance to the obstacle is less than or equal to the third reference distance (Yes in operation 1170), the DAS 100 may brake the vehicle 1 (1180).

The operation 1180 may be the same as the operation 1060 of FIG. 6.

As described above, as the distance between the vehicle 1 and the obstacle decreases, the DAS 100 may warn the obstacle of a collision using an omnidirectional sound, directional sound, and directional light.

Accordingly, the DAS 100 may inhibit or prevent a collision between the vehicle 1 and people (or animals) caused by the reverse of the vehicle 1 without causing inconvenience.

As is apparent from the above, according to the embodiments of the disclosure, the driver assistance system, the control method thereof and the vehicle can warn an outside of the vehicle that the vehicle is reversing via light and/or sound.

According to the embodiments of the disclosure, the driver assistance system, the control method thereof and the vehicle can warn that an obstacle is detected at a rear of the vehicle when in reverse.

Although embodiments have been described for illustrative purposes, those having ordinary skill in the art will appreciate that various modifications, additions and substitutions are possible, without departing from the scope and spirit of the disclosure. Therefore, embodiments have not been described for limiting purposes.

What is claimed is:

1. A driver assistance system comprising:
a first speaker disposed on a vehicle and configured to output an omnidirectional sound;
a second speaker disposed on the vehicle and configured to output a directional sound; and
a controller configured to be electrically connected to the first speaker and the second speaker,
wherein the controller is configured to:
control the first speaker to output the omnidirectional sound while the vehicle is reversing, and
based on an obstacle being identified at a rear of the vehicle while the vehicle is reversing, control the second speaker to output the directional sound directed toward the obstacle.

2. The driver assistance system of claim 1, further comprising a camera having a field of view facing the rear of the vehicle and configured to capture image data,
wherein the controller is configured to identify the obstacle located at the rear of the vehicle based on processing of the image data.

3. The driver assistance system of claim 2, wherein the controller is configured to:
identify a direction of the obstacle based on the processing of the image data, and
control the second speaker to output the directional sound toward the obstacle.

4. The driver assistance system of claim 2, wherein the controller is configured to:
classify the obstacle based on the processing of the image data, and
control the second speaker to output directional sounds with different frequencies based on a classification of the obstacle.

5. The driver assistance system of claim 4, wherein the controller is configured to:
control the second speaker to output a directional sound with a first frequency based on the obstacle being a person, and
control the second speaker to output a directional sound with a second frequency greater than the first frequency based on the obstacle being an animal.

6. The driver assistance system of claim 1, further comprising an ultrasonic sensor configured to have a field of view facing the rear of the vehicle and acquire ultrasonic data,
wherein the controller is configured to identify the obstacle located at the rear of the vehicle based on processing of the ultrasonic data.

7. The driver assistance system of claim 6, wherein the controller is configured to:
identify a direction of the obstacle based on the processing of the ultrasonic data, and
control the second speaker to output the directional sound toward the obstacle.

8. The driver assistance system of claim 6, wherein the controller is configured to:
identify a distance to the obstacle based on the processing of the ultrasonic data, and
control the second speaker to output the directional sound based on the distance to the obstacle.

9. The driver assistance system of claim 8, wherein the controller is configured to:
control the second speaker to output the directional sound based on the distance to the obstacle being greater than a reference distance, and
brake the vehicle based on the distance to the obstacle being less than or equal to the reference distance.

10. The driver assistance system of claim 1, wherein the second speaker comprises a plurality of ultrasonic speakers each of which outputs ultrasonic waves with different frequencies.

11. The driver assistance system of claim 1, further comprising:
a motor configured to rotate or move the second speaker.

12. The driver assistance system of claim 1, wherein the controller is configured to:
control the first speaker and the second speaker to output a sound of a first volume during daytime, and
control the first speaker and the second speaker to output a sound of a second volume lower than the first volume at night.

13. The driver assistance system of claim 1, wherein the controller is configured to control the second speaker to output the directional sound directed toward the obstacle based on a distance to the obstacle being less than or equal to a first reference distance.

14. The driver assistance system of claim 13, further comprising a light source configured to emit light,
wherein the controller is configured to control the light source to emit the light toward the obstacle based on the distance to the obstacle being less than or equal to a second reference distance less than the first reference distance.

15. The driver assistance system of claim 14, wherein the controller is configured to brake the vehicle based on the distance to the obstacle being less than or equal to a third reference distance less than the second reference distance.

16. A control method of a driver assistance system, the control method comprising:
outputting an omnidirectional sound while a vehicle is reversing;
identifying an obstacle located at a rear of the vehicle while the vehicle is reversing; and
outputting a directional sound directed toward the obstacle based on the obstacle being identified at the rear of the vehicle.

17. The control method of claim 16, wherein the identifying of the obstacle located at the rear of the vehicle comprises:
processing image data acquired by a camera configured to have a field of view facing the rear of the vehicle;
classifying the obstacle based on the processing of the image data; and
outputting directional sounds with different frequencies based on a classification of the obstacle.

18. The control method of claim 16, wherein the identifying of the obstacle located at the rear of the vehicle comprises:
processing ultrasonic data acquired by an ultrasonic sensor configured to have a field of view facing the rear of the vehicle;
identifying a distance to the obstacle based on the processing of the ultrasonic data;
outputting the directional sound based on the distance to the obstacle being greater than a reference distance; and
braking the vehicle based on the distance to the obstacle being less than or equal to the reference distance.

19. The control method of claim 16, further comprising:
outputting a sound of a first volume during daytime; and
outputting a sound of a second volume lower than the first volume at night.

20. A vehicle, comprising:
a first speaker configured to output an omnidirectional sound;
a second speaker configured to output a directional sound; and
a controller configured to be electrically connected to the first speaker and the second speaker,
wherein the controller is configured to:
control the first speaker to output the omnidirectional sound while the vehicle is reversing, and
based on an obstacle being identified at a rear of the vehicle while the vehicle is reversing, control the second speaker to output the directional sound directed toward the obstacle.

* * * * *